United States Patent [19]
Titus et al.

[11] 3,857,776
[45] Dec. 31, 1974

[54] DEEP SUBMERSIBLE POWER ELECTRODE ASSEMBLY FOR GROUND CONDUCTION OF ELECTRICITY

[75] Inventors: Charles H. Titus, Newtown Square; J. Kenneth Wittle, Berwyn, both of Pa.

[73] Assignee: Electro-Petroleum, Inc., Bryn Mawr, Pa.

[22] Filed: June 14, 1973

[21] Appl. No.: 369,948

[52] U.S. Cl.............. 204/290 R, 166/45, 166/248, 204/286, 204/294, 204/297
[51] Int. Cl....... B01k 3/04, E21b 43/00, B01k 3/08
[58] Field of Search...... 166/65, 248; 204/184, 186, 204/188, 290 R, 286, 294, DIG. 12

[56] References Cited
UNITED STATES PATENTS

| | | | |
|---|---|---|---|
| 3,214,360 | 10/1965 | Bender et al. | 204/224 |
| 3,285,844 | 11/1966 | Hallsworth et al. | 204/284 |
| 3,303,119 | 2/1967 | Dell | 204/290 |
| 3,417,823 | 12/1968 | Faris | 166/45 |
| 3,489,668 | 1/1970 | Anton et al. | 204/286 |
| 3,547,193 | 12/1970 | Gill | 166/248 |
| 3,607,708 | 9/1971 | Priscu et al. | 204/297 R |
| 3,782,465 | 1/1974 | Bell et al. | 166/248 |

*Primary Examiner*—G. L. Kaplan
*Assistant Examiner*—Aaron Weisstuch
*Attorney, Agent, or Firm*—J. Wesley Haubner

[57] ABSTRACT

In a consumable underground electrode assembly adapted for ground conduction of electric power current in an environment of saline and oleaginous fluids under high hydrostatic pressure, an elongate graphite electrode having a cable terminal at its upper end is encased in a tubular insulating sheath and is conductively exposed at only its lower face. The electrode is disposed at the outlet end of a fluid supply conduit through which a saline electrolyte is supplied to an axial cooling passage defined at least in part by the electrode itself and having an outlet port adjacent the exposed lower face of the electrode. The electrode and all sheathing and enclosing elements are designed to erode axially at substantially the same rate under electrochemical action resulting from current conduction at the lower face.

8 Claims, 4 Drawing Figures

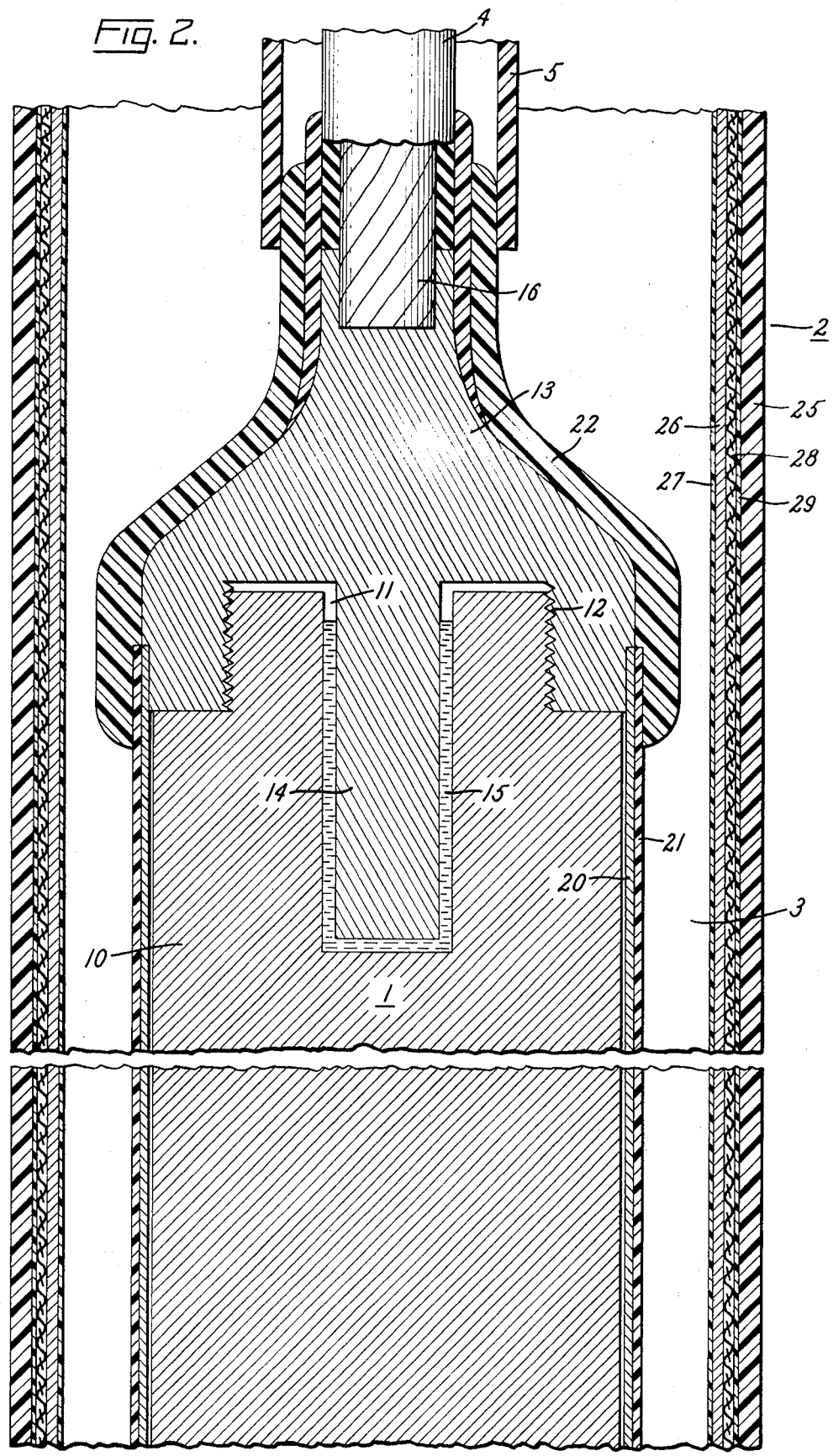

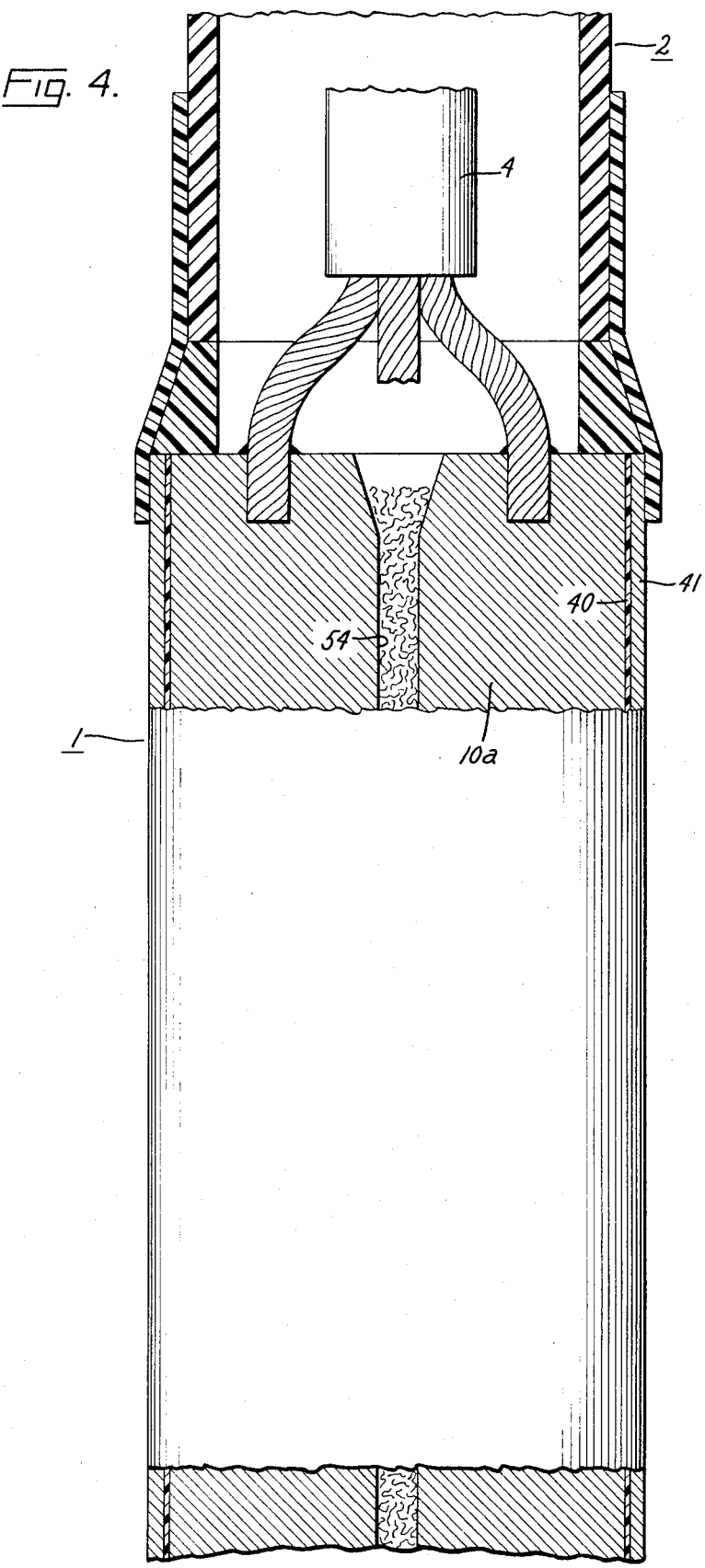

DEEP SUBMERSIBLE POWER ELECTRODE ASSEMBLY FOR GROUND CONDUCTION OF ELECTRICITY

Our invention relates to deep submersible power electrodes for ground conduction of electric current, and particularly to a power-conveying anode assembly. The invention is especially applicable to high voltage, high current anodes in apparatus for the conduction of electricity through earth formations, as in secondary oil recovery operations or other treatment of oil bearing strata. The following published prior art is representative of that now known to applicants: U.S. Pat. Nos. 3,547,193-Gill; 3,417,823-Faris; 3,616,421-MacIntosh.

Various electrothermal techniques which involve the conduction of electric current through ground have been proposed heretofore to facilitate recovery of oil from underground oil bearing formations. one such technique which comprehends conduction of high unidirectional power current at high voltage between spaced-apart ground electrodes is illustrated in U.S. Pat. No. 3,782,465 issued to C. W. Bell and C. H. Titus and assigned to the same assignee as the present application. In that copending application there is disclosed but not claimed an erosion-resistant high voltage underground electrode suitable for immersion in a moving stream of electrolytic fluid under high hydrostatic pressure. The present application is directed to a consumable, or sacrificial, electrode especially adapted to be utilized in the system and in the disposition disclosed in the foregoing copending application.

Accordingly, it is a general object of our invention to provide an improved high power underground electrode capable of carrying high unidirectional current over extended time periods in a chemically hostile environment and under high pressure and voltage conditions.

It is a more particular object of our invention to provide a consumable or sacrificial anode especially adapted for deep underground submersion and operation in a chemically hostile high pressure environment.

Still another object of our invention is to provide an improved electrode assembly adapted for deep underground submersion and operation in a chemically hostile high pressure environment and including current control and protective means for facilitating controlled electro-chemical erosion of the electrode.

In carrying out our invention in one preferred embodiment we provide an elongate tubular electrode assembly primarily adapted for operation as a high voltage anode in a deep bore hole which penetrates an oil bearing earth formation. The electrode is designed for suspension at the lower end of an electric power cable adjacent the outlet of an insulating fluid conduit which carries saline water for electrolytic conduction and cooling. The side walls of the electrode body are encased in a tubular sheath of insulating material and only the end remote from the power cable connection is conductively exposed to the surrounding electrolyte and earth formation. The fluid conduit supplies saline water, under pressure greater than the ambient pressure in the formation, through an axial passageway extending for the full length of the electrode and formed wholly or partly by the electrode itself to an outlet port at the exposed end of the electrode. In traversing the axial passage the electrolyte cools the electrode, but conduction between the electrolyte and electrode is confined to the exposed lower end of the electrode. In operation, electrochemical erosion of the electrode is thus confined to its exposed end. In a preferred form the axial fluid passage along the electrode body is annular and defined between the electrode side walls and a tubular enclosing shield, the shield being formed of materials which erode axially under operating conditions at substantially the same rate as does the electrode body. The electrode body may have a diameter of several inches and a length in the order of several feet or less to fifty feet or more, as may be determined by the desired time of operation between anode replacements.

Our invention will be more fully understood and its objects and advantages further appreciated by referring now to the following detailed specification taken in conjunction with the accompanying drawing, wherein:

FIG. 2 is an axial cross-sectional view showing in greater detail the electrode assembly generally illustrated at FIG. 1 and providing an electrode cooling passage external to the electrode body;

FIG. 4 is an axial cross-sectional view of an electrode assembly embodying our invention in a modified form having an internal electrode cooling passage.

Figure 1:
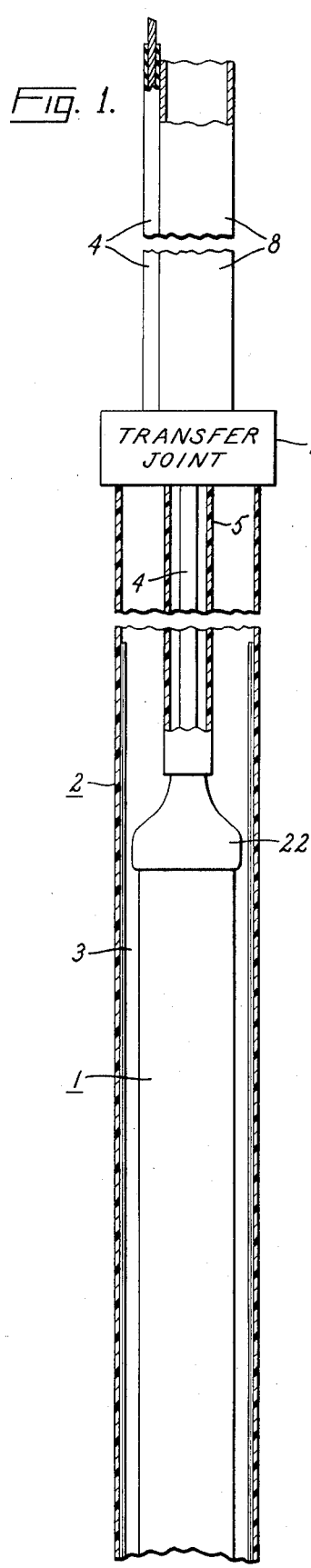
FIG. 1 is a side elevational view, partly in cross section, of an electrode assembly and connected fluid and electric current supply conduits embodying our invention.

Referring now to the drawing, and particularly to FIG. 1, we have shown a ground electrode assembly comprising an elongate current conducting electrode 1 and a tubular coaxial insulated conduit 2 surrounding the electrode in radially spaced apart relation to shield the electrode and to define therebetween an annular axial passageway 3. The enclosing conduit 2 extends for the full length of the electrode body 1 and is open at its lower end. The conduit 2 is substantially imperforate and is connected at its upper end to a source of fluid supply source above the electrode body 1. The electrode 1 is suspended within the conduit 2 by means of a current conducting cable 4 which is loosely positioned within a protective tube or cable conduit 5 of insulating material. The fluid conduit 2, the cable 4 and the cable conduit 5 extend for a substantial distance vertically above the electrode 1 to a transfer joint 7 wherein the cable conduit 5 is terminated and the power cable 4 emerges from the fluid conduit 2. Above the transfer joint 7 a metal fluid conduit 8 and the electric power cable 4 extend in lateral juxaposition to terminal points (not shown) above ground. The cable and fluid conduit transfer joint 7 is more fully described and claimed in U.S. Pat. No. 3,674,912-Titus et al.

In a preferred embodiment of our invention having the general configuration illustrated at FIG. 1 and designed for anodic operation under high current and voltage conditions (i.e., 25 kw to 1,000 kw or more at voltages above 200 volts) and under high ambient hydrostatic pressure several thousand feet below the surface of the earth, we utilize an anode body 1 having a length of the order of several feet or less to fifty feet or more and a diameter of the order of two to four inches suspended a substantial distance below the transfer joint 7. In an oil bearing formation several hundred feet in depth the anode is preferably centrally located vertically and the transfer joint is near the top of the formation.

At FIG. 2 there is shown in greater detail the structure of the current conducting anode 1 and the adjacent portion of the enclosing fluid conduit 2. The anode itself comprises an elongate solid body 10 of electrically conductive material such as graphite having an axial recess 11 at its upper end. The graphite body 10 is threadedly connected, as at 12, to a metal connecting cap 13 having a probe 14 loosely fitting into the recess 11. In long anodes the graphite body 10 may be a sectionalized assembly of axially adjacent units connected by integral threaded studs similar to the connection 12. To improve electrical connection between the graphite body 10 and the metal connecting cap 13 the recess 11 is filled with a body of mercury 15. The connecting cap 13 may desirably be formed of a nickel-steel alloy and is connected at its upper end, as by welding or brazing, to a conductor 16 in the power cable 4.

To provide mechanical support and protection for the graphite body 10 the graphite body is encased within a close fitting metallic tube 20, preferably formed of a nickel-steel alloy. The metallic sheath 20 is a close but not tight fit over the graphite body 10, preferably providing only sufficient clearance to facilitate endwise insertion of the graphite body into the tube 20. In order to insulate the side walls of the assembled conductive anode parts 10, 20, the outer surface of the metallic tube 20 is encased in a tight fitting sheath 21 of suitable insulating material, such as the tetrafluoroethylene polymer composition known commercially as "Teflon." The metal and insulating sheaths 20 and 21, respectively, which closely encase the elongate graphite body 10 extend for the full length of the graphite body 10 and are open at their lower ends. The metal sheath 20 extends upwardly beyond the upper periphery of the graphite body 10 and is brazed to a lower peripheral portion of the metal connecting cap 13. The lower end of the power cable 4 and the metal connecting cap 13 are enclosed in a conical cap 22 of insulating material such as Teflon tape or the like. The terminal cap 13 and the metal tube 20, while fitting snugly over the graphite body 10, need not be sealed against entry of electrolyte between the tube 20 and the graphite. Any such long column of electrolyte presents such a high resistance path to the formation that no appreciable current will traverse it so that no appreciable erosion will occur along the electrode side walls. Only the lower end face of the anode body is effectively exposed to current conduction and erosion.

The anode structure described above provides electrical and mechanical protection for the graphite anode body 10, conductively exposing only its lower end to the surrounding electrolyte. The insulating sheath 21 prevents conduction from the side walls of the anode while the metal sheath 20 resists radial pressure from the high pressure fluid in the axial passage 3. The enveloping metal cap 13 and connected sheath 20 resist the very considerable axial pressure of the electrolyte and the close frictional fit of the long graphite body 10 in the sheath 20 assists in supporting the weight of the graphite body.

The enclosing fluid conduit 2 is radially spaced from the anode 1 to define therebetween an annular axial passage 3 for the flow of electrolyte along the outer surface of the anode. In the dimensional examples referred to above this space may be of the order of ⅛ to ¾ inch. The fluid conduit 2 extends as a shield from above the anode 1 for the full length of the anode and to its lower end and is open at the lower end to provide a fluid outlet port. Above the anode the fluid conduit 2 extends upwardly to a source of fluid supply, as to the transfer joint 7 at FIG. 1.

The fluid conduit 2 is formed of a rigid imperforate tube 25 of insulating material, such as glass-fibre filled epoxy resin, and is lined internally in the region of the anode 1 to resist excessive erosion by the saline solution which flows under high pressure and electrical stress in the axial passage between the anode and the fluid conduit. To this end we provide in the anode region of the insulating tube 25 a metal sleeve 26 insulated internally and externally and extending from a point somewhat above the anode cap 13 to the bottom end of the tube 25. The metal sleeve 26 which is preferably formed of stainless steel, is coated internally with a layer of high quality insulating material 27, such as Teflon and the like, and is wrapped externally with an appreciable thickness of cotton cloth or tape 28. Preferably the cotton tape 28 is impregnated with a concentrated saline solution. Over the cotton cloth or tape 28 we place a sleeve of insulating material 29 which may desirably be formed of Teflon and heat-shrunk in place. The rigid conduit liner comprising the steel sleeve 26 and its several insulating coatings 27, 28, 29 is then inserted in the lower end of the precast epoxy tube 25. Alternatively the steel liner, wrapped and insulated as described, may be wrapped for its entire length with a layer of epoxy glass tape to a thickness of the order of one-fourth inch to form an integral anode shield which is then coupled at a point above the anode cap 13 to the lower end of a filament-wound epoxy-glass pipe.

Figure 3:
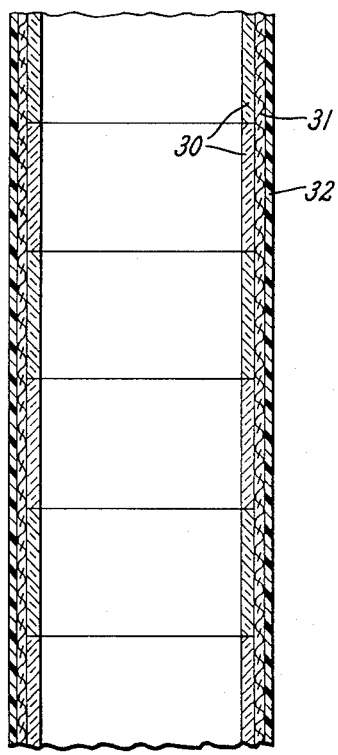
FIG. 3 is a fragmentary cross-sectional view of a modified form of enclosing fluid conduit constituting part of the electrode assembly shown at FIGS. 1 and 2.

At FIG. 3 we have shown an alternative form of tubular anode shield adapted to be utilized in the electrode assembly shown at FIG. 2. At FIG. 3 an insulating liner for the lower end of the epoxy tube or pipe 25 is formed of a plurality of axially stacked rings 30 of ceramic material, such as alumina or silicon dioxide, and the outer surface of the stacked rings is wrapped with a layer 31 of impregnated cotton cloth or tape. Desirably an insulating sheath 32 of heat-shrunk Teflon tubing or the like is placed over the wrapped assembly of ceramic rings. The assembled liner is then wrapped with epoxy fiberglass tape or inserted into a epoxy tube 25 (FIG. 2) as previously described.

At FIG. 4 we have illustrated an alternative embodiment of our invention wherein the cooling electrolyte is supplied to the lower exposed conducting end of the anode body through a passageway wholly within the anode rather than through an annular external passage between the anode and an enclosing shield. In this embodiment of the invention the insulating fluid conduit 2 does not surround the elongate anode 1 but terminates at and is coupled to the upper end of an anode having an axial passageway therethrough. More specifically, we have shown at FIG. 4 a tubular body of graphite 10a having an insulating coating 40 of material such as Teflon and a rigid outer shield 41 which may be steel or ceramic tubing wrapped with epoxy glass tape or the like. The anode body 10a may of course be disposed within an externally insulated metal sheath as illustrated at FIG. 2, or within a cast epoxy cylinder preferably sheathed with Teflon. Whatever protective sheathing is selected for the anode 10a it should be of materials which erode axially upward from the conductively exposed lower face of the anode at the same rate as does the anode body itself.

In the embodiment illustrated at FIG. 4 the anode body 10a includes an internal axial passage 54 open at each end of the body 10a and forming an outlet port at the exposed lower end of the anode. If desired the internal passage 54 may be filled with a porous body of sintered glass or ceramic material to prevent backflow of sand without significantly restricting downward flow of the electrolyte. At its upper end the anode of FIG. 4 is coupled to the outlet end of the fluid conduit 2 as an extension of the conduit and is electrically connected to one or more conductors of the cable 4. While the upper end surface and the internal passage 54 at FIG. 4 are not coated with insulating material, substantially no current is conducted from these surfaces because of the high resistance of the path through the electrolyte in passage 54.

In the several anode assemblies described above current flow between the anode body (10 or 10a) and the surrounding earth formation will be essentially confined to the exposed lower end of the anode body. Direct conduction between the side wall of the anode 1 and the earth formation is substantially prevented by the insulating sheath on the anode. In the enclosed assembly of FIGS. 1 and 2 conduction from the side walls of the anode is further inhibited by the insulated enclosing shield formed by the extended fluid conduit 2, the long path through electrolytic fluid in the annular passage between the anode 1 and conduit 2 being of relatively high resistance. The exposed lower end of the graphite body (10 or 10a), having no protective coating, is designed to erode in operation as a result of electro-chemical action at the interface between the exposed lower end and the surrounding earth formation. The protective tubular sheaths on the graphite body are designed to erode axially at about the same linear rate as the graphite itself. In the enclosed assembly of FIGS. 1 and 2 the enclosing shield formed of the extended epoxy pipe 25 and its protective liner 26–29 is designed to erode at approximately the same axial rate.

The anode 1 may be assembled in varying lengths depending upon the desired time of operation between anode replacements. To this end we contemplate that the graphite body (10 or 10a) may have an axial length of the order of several feet or less up to 50 feet or more. For convenience it is desirable that the anode body be assembled within the steel tube 20 in a plurality of axial sections mechanically and electrically connected in series.

As indicated in the copending applications referred to above, it is contemplated that in operation the radially inward ambient pressure exerted upon the water pipe 2 by the surrounding formation may be of the order of 3,000 pounds per square inch or more and that the pressure of the electrolyte supplied through the conduit 2 and traversing the anode passage will be sufficiently great to ensure that electrolyte constantly flows axially downward and through the outlet port at the lower end of the anode into the formation. Our anode is designed to conduct up to several hundred amperes at voltages of the order of 200 – 2,000 volts and thus to generate very substantial quantities of heat in the saline fluid surrounding the electrode assembly. For operation under these extremely hostile conditions the anode sheathing 20, 21 or 40, 41 is designed to protect the graphite body against radial pressure and to insulate the anode side walls. In the enclosed assembly of FIGS. 1 and 2 the insulated rigid sheath in the anode region of the extended fluid conduit is designed to maintain the integrity of the annular fluid passage between the anode and the enclosing conduit. Electrolytic fluid supplied under pressure through the anode passage, internal or external, serves to cool the anode 1 and constantly to renew the electrolyte at the conductive lower end of the anode as the heated electrolyte dissipates into the surrounding earth formation.

While we have described and illustrated certain preferred embodiments of our invention by way of illustration many modifications will occur to those skilled in the art and we therefore wish to have it understood that we intend in the appended claims to cover all such modifications as fall within the true spirit and scope of our invention.

What we claim as new and desire to secure by Letters Patent of the United States is:

1. In a deep submersible and consumable high voltage power anode assembly for direct underground installation exposed to a surrounding mixture of saline and oleaginous fluids under a hydrostatic pressure head of the order of at least several hundred feet, an elongate electrode body including a tubular sheath of insulating material and having at one end a terminal for connection to a source of positive unidirectional voltage of the order of at least 200 volts above ground potential, said tubular sheath conductively exposing to said fluid mixture only an end face of said electrode body opposite said one end, a rigid and substantially fluid impervious tubular insulating shield enclosing the side walls of said electrode body, and exposing said end face, said electrode body and shield being designed to be eroded axially at said end face and at substantially the same linear rates as a result of electro-chemical action by electric current passing between said end face and said fluid mixture, a fluid passage defined at least in part by said electrode body and traversing said body for substantially the full axial length thereof, said passage having an outlet port adjacent said exposed end face, and means for introducing in electrolytic fluid into said fluid passage at said one end of said electrode body and maintaining said electrolytic fluid under pressure greater than the hydrostatic pressure of said surrounding fluid mixture, whereby said electrolytic fluid traverses said fluid passage to cool said electrode body and bathe said end face in conductive fluid.

2. A consumable anode assembly according to claim 1 wherein said electrode body comprises a body of graphite encased in a close-fitting protective sheath of metal.

3. A consumable anode assembly according to claim 2 wherein said protective sheath is of steel and said tubular insulating sheath is a polytetrafluoroethylene composition.

4. A consumable anode assembly according to claim 1 wherein said axial fluid passage is formed internally of said electrode body and said fluid supply means comprises a conduit having an outlet end coupled to said electrode body at said one end.

5. A consumable power anode assembly according to claim 1 wherein said imperforate tubular insulating shield surrounds said electrode body in radially spaced relation thereby to define between said shield and the side walls of said electrode body an annular fluid passage having an outlet port adjacent said end face, whereby said electrolytic fluid traverses the side walls of said electrode body within said annular fluid passage thereby to cool said electrode body and to bathe said end face thereof in conductive fluid, conductive fluid in said annular passage providing high resistance to current flow through the side walls of said electrode body.

6. A consumable electrode assembly according to claim 5 wherein said tubular insulating shield comprises a rigid insulating cylinder having an insulated protective liner extending axially for at least the full length of said annular fluid passage.

7. A consumable electrode assembly according to claim 6 wherein said tubular shield comprises the outlet end of a rigid insulating conduit for supplying electrolytic fluid and said protective liner comprises a metal tube coated internally with insulating material and wrapped externally with a layer of absorbent fiber impregnated with a saline liquid, said liner fitting closely within the interior of said insulating conduit, said conduit and protective shield eroding in operation adjacent said end face of said electrode at substantially the same axial rate as said electrode.

8. A consumable electrode assembly according to claim 5 where said tubular shield comprises a sectionalized ceramic tube having an internal coating of plastic insulating material and an external coating of absorbent fiberous material impregnated with saline liquid.

* * * * *